United States Patent
Walston (10) Patent No.: US 10,423,743 B2
(45) Date of Patent: Sep. 24, 2019

(54) CONTEXT-DEPENDENT USEFUL SKEW ESTIMATION FOR OPTIMIZATION, PLACEMENT, AND CLOCK TREE SYNTHESIS

(71) Applicant: Synopsys, Inc., Mountain View, CA (US)

(72) Inventor: Joseph R. Walston, Durham, NC (US)

(73) Assignee: Synopsys, Inc., Mountain View, CA (US)

(*) Notice: Subject to any disclaimer, the term of this patent is extended or adjusted under 35 U.S.C. 154(b) by 39 days.

(21) Appl. No.: 15/797,548

(22) Filed: Oct. 30, 2017

(65) Prior Publication Data

US 2018/0137217 A1    May 17, 2018

Related U.S. Application Data

(60) Provisional application No. 62/422,231, filed on Nov. 15, 2016.

(51) Int. Cl.
G06F 17/50    (2006.01)
G06F 1/10    (2006.01)

(52) U.S. Cl.
CPC ............ *G06F 17/5031* (2013.01); *G06F 1/10* (2013.01); *G06F 17/505* (2013.01); *G06F 2217/84* (2013.01)

(58) Field of Classification Search
CPC ...... G06F 17/5031; G06F 17/505; G06F 1/10; G06F 2217/84
See application file for complete search history.

(56) References Cited

U.S. PATENT DOCUMENTS

| | | | | |
|---|---|---|---|---|
| 6,609,241 B2* | 8/2003 | Yonemori | ............... | G06F 1/10 716/114 |
| 6,910,202 B2* | 6/2005 | Minami | ............... | G06F 17/505 716/104 |
| 7,075,336 B2* | 7/2006 | Kojima | ............... | G06F 1/10 326/93 |
| 7,346,873 B2* | 3/2008 | Mandry | ............... | G06F 17/5045 716/114 |
| 7,571,406 B2* | 8/2009 | Johnston | ............... | G06F 17/505 327/158 |
| 7,739,642 B2* | 6/2010 | Albrecht | ............... | G06F 17/505 716/113 |
| 7,917,882 B2* | 3/2011 | Panigrahi | ............... | G06F 17/5031 716/118 |
| 9,571,074 B2* | 2/2017 | Chowdhury | ............... | H03K 5/05 |
| 9,779,201 B2* | 10/2017 | Millar | ............... | G06F 17/5081 |
| 2016/0118966 A1* | 4/2016 | Chowdhury | ............... | H03K 5/05 327/161 |

* cited by examiner

*Primary Examiner* — Naum Levin
(74) *Attorney, Agent, or Firm* — Park, Vaughan, Fleming & Dowler LLP; Laxman Sahasrabuddhe (57) ABSTRACT

A method for optimizing a circuit design includes computing clock latency estimates for a set of sequential circuit elements, modifying the clock latency estimates based on relative optimizability of (1) a set of input data paths that are electrically coupled to one or more inputs of the sequential circuit element and (2) a set of output data paths that are electrically coupled to one or more outputs of the sequential circuit element, and optimizing the circuit design based on the modified clock latencies.

21 Claims, 5 Drawing Sheets

CONTEXT-DEPENDENT USEFUL SKEW ESTIMATION FOR OPTIMIZATION, PLACEMENT, AND CLOCK TREE SYNTHESIS

RELATED APPLICATION

This application claims benefit of U.S. Provisional Application Ser. No. 62/422,231, filed on 15 Nov. 2016, by the same inventor, having the contents of which are herein incorporated by reference in their entirety for all purposes.

BACKGROUND

Technical Field

This disclosure relates to integrated circuits (ICs). More specifically, this disclosure relates to optimizing circuit design based on context-dependent useful skew estimation.

Related Art

Complex high-frequency circuits, for example, central processing units (CPUs), rely on accurately controlling clock delays to the critical path sequential elements in the circuit. Processors running at GHz frequencies utilize this technique to help balance effects from non-standard logic, like memory elements, and from logic paths with multiple stages. A custom-designed logic may be difficult to optimize and may require more skewing to achieve the highest frequency, whereas standard logic (utilizing commonly available reusable component) may often be optimized more aggressively for higher frequencies. High-frequency designs have a mixture of different types of data paths, often directly connected by a clocked sequential cell.

Conventional optimization of these designs to run at high-frequency has been a manual, custom procedure requiring deep knowledge of the architecture of the design. Existing electronic design automation (EDA) solutions do not utilize the inherent characteristics of the design (such as non-standard logic and asymmetric logic path depth) and provide minimal clock skewing, thus not achieving the highest frequencies possibly obtainable for the design architecture.

SUMMARY

Some embodiments described herein provide techniques and systems for relates to optimizing circuit design based on context-dependent useful skew estimation. During operation, an IC design system can compute clock-latency-estimates for a set of sequential-circuit-elements. Next, the IC design system can modify the clock-latency-estimate for each sequential-circuit-element based on relative optimizability of (1) a set of input data paths that are electrically coupled to one or more inputs of the sequential-circuit-element, and (2) a set of output data paths that are electrically coupled to one or more outputs of the sequential-circuit-element.

In some embodiments, at least one clock-latency-estimate comprises: (1) computing a difference between logic depths on an input side and an output side of a sequential element; (2) multiplying the difference by a scaling factor to obtain a clock-latency-adjustment, and (3) applying the clock-latency-adjustment to the clock-latency-estimate.

In some embodiments, prior to optimizing the circuit design based on the modified clock-latency-estimates, the method comprises setting timing-endpoint margins for data paths by an amount corresponding to the modifications to the clock-latency-estimates.

In some embodiments, the IC design system can create a set of clock tree constraints based on the modified clock-latency-estimates. Next, the IC design system can remove the timing-endpoint margins for the data paths, and perform clock tree synthesis for the circuit design based on the set of clock tree constraints.

In some embodiments, the optimizability of a data path increases with the logic depth of the data path. In some embodiments, the optimizability of un-optimizable logic is zero. In some embodiments, the optimizability of non-standard logic elements is low.

BRIEF DESCRIPTION OF THE FIGURES

To easily identify the discussion of any particular element or act, the most significant digit or digits in a reference number refer to the figure number in which that element is first introduced.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

"Critical path" in this context refers to the path between an input and an output with the maximum delay.

Latency and clock skew constraints may be determined before clock tree synthesis (CTS), which may drive datapath optimization to increase skew effectiveness. Latencies may be calculated early in the implementation flow to help drive datapath optimization to produce a higher-frequency design after CTS. These latencies may not require user input, may be refined later in the flow, and may be converted to CTS constraints. There may be three modes: one for analysis; one for optimization; and one for CTS. The implementation flow may switch between these modes.

A high-frequency design may be able to achieve a higher maximum frequency (FMAX) without additional user inputs by reducing critical path timing violations through more clock skewing. Additionally, as this methodology may apply to all paths, the total timing violations may be reduced, and the implementation tool may execute faster and may allocate more resources to reduce design power. Thus the process results in a greater FMAX, a lower design power, and a faster turn-around-time.

The analysis mode provides latency offsets that balance the slack across a given sequential element (register, macro, etc.). This mode is the equivalent of pre-CTS useful skew estimates and is provided for analysis only, as it may not drive enhanced optimization.

The optimization mode may generate latency offsets equal to the analysis-mode offsets modified by local conditions present in a netlist. These conditions may be relative logic depth on either side of the sequential element, the presence of un-optimizable logic (e.g., memory elements), non-standard logic elements (e.g., level shifters, delay elements) that may have limited optimization potential relative to their delay, and other special features of a given datapath that may limit datapath optimization asymmetrically across the sequential element.

The clock latency offset may be modified in a specific manner for each of the conditions. For example, for different logic depths on either side of a sequential element, the latency offset may be modified by the difference between the two depth counts times a delay scaling factor (i.e., a factor determined by the expected drive strength deltas of the library for a given cell). Thus, the optimization mode may modify the latencies generated by the analysis mode based on the relative optimizability of the datapaths on either side of the sequential element.

If a given register has more logic depth on the output side, then the clock latency is increased to that register to increase optimization on the longer datapath. In addition to the clock latency modifications, an endpoint margin may be applied to the other side of the sequential element to prevent any path in the design from being made optimistic. The optimization mode drives certain timing paths to be optimized more, but none to be optimized less, than analysis mode.

The CTS mode converts the existing clock latency offsets to clock tree constraints; therefore, the clock tree may be built with the expected clock delays. Additionally, the applied endpoint margins are removed at this point to avoid additional pessimism in the design. After this step, CTS may be performed on the design, including utilizing automated CCD useful skew technology.

A gate-level netlist and timing graph may be generated after the first compile stage in synthesis to help with latencies generation. A floorplan-based synthesis (DC Graphical) may enhance performance. The latencies are refined prior to the place_opt step in ICC and ICC-II, which may modify the latencies based on any design changes up to that point.

Figure 1:
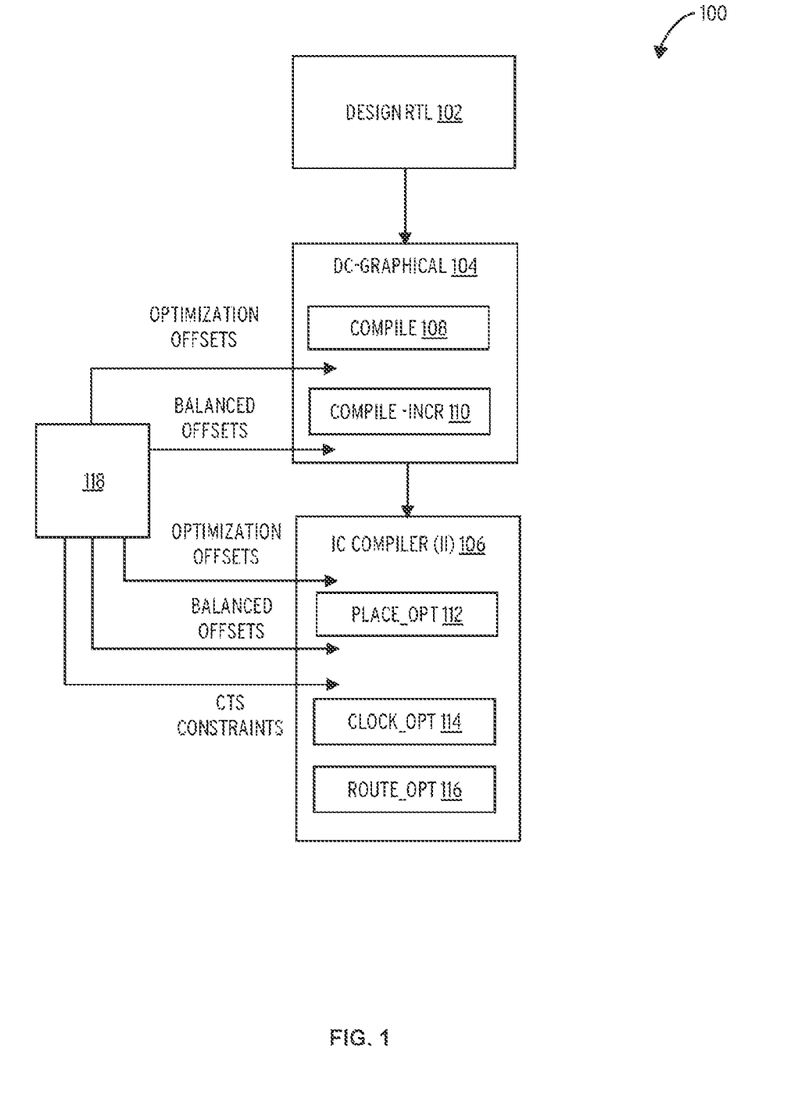
FIG. 1 illustrates an embodiment of an implementation process 100.

Referring to FIG. 1, an implementation process 100 comprises a design register-transfer level 102, a design compiler (graphical) 104, an integrated circuit compiler 106, and a circuit optimization method 118. The design compiler (graphical) 104 further comprises a compiling component 108 and an incremental compiling component 110. The integrated circuit compiler 106 further comprises a placement optimization component 112, a clock optimization component 114, and a route optimization component 116.

The circuit optimization method 118 may generate optimization offsets, balanced offsets, and CTS constraints. The optimization offsets may be implemented by the design compiler (graphical) 104 and the integrated circuit compiler 106; the balanced offsets may be implemented by the design compiler (graphical) 104 and the integrated circuit compiler 106; and the CTS constraints may be implemented by the integrated circuit compiler 106.

The latencies generated may utilize the standard set_clock_latency constraint command. Any endpoint margins are applied with the set_path_margin command, and may be removed in the CTS mode. Once the CTS mode is enabled, the latencies are converted to clock_balance_point constraints which may guide the implementation of the clock tree to realize the insertion delays to the sequential elements as specified by the latencies. When the clock tree is constructed with these latency offsets, the CCD useful skew functionality may have a better starting point for both clock latency and datapath delays, and, thus, CCD may enhance clock tree optimization and may produce better worst negative slack (WNS) on paths sensitive to useful skew.

Figure 2:
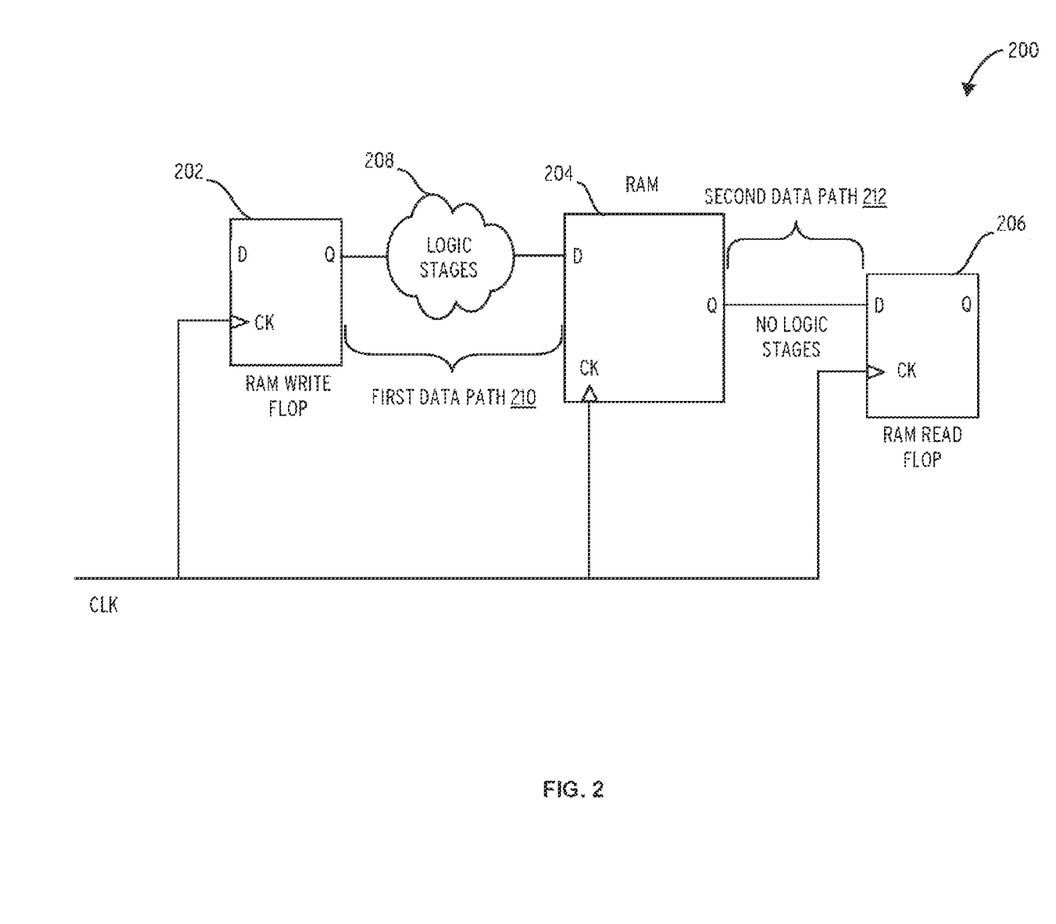
FIG. 2 illustrates an embodiment of a RAM timing path 200.

Referring to FIG. 2, a RAM timing path 200 comprises a first register 202, a clocked memory element 204, a second register 206, logic stages 208, a first data path 210, and a second data path 212.

The first data path 210 may connect the first register 202 to the clocked memory element 204, and may comprise the logic stages 208. The second data path 212 may connect the clocked memory element 204 to the second register 206. The first data path 210 and the second data path 212 may be the critical path; however, the first data path 210 comprises the logic stages 208 and, thus, may be optimized.

The clocked memory element 204 may be a middle sequential element. As shown in FIG. 2, the clocked memory element 204 has a large read cycle delay and has no logic between the output of the clocked memory element 204 and the second register 206. Thus, resources to perform data path optimization may be focused on the first data path 210 to increase the skew of the clocked memory element 204.

A conventional data path optimization technique does not perform this function, resulting in a degraded FMAX. The first data path 210 has minimal positive slack to allow skew of the clocked memory element 204, and the second data path 212 benefits little from a small skew adjustment of the clocked memory element 204. Additionally, a concurrent clock and data (CCD) process may either shorten the latency of the clocked memory element 204 or delay the first register 202 and/or the second register 206 at the CTS stage.

The circuit optimization method 118 allocates more resources to optimize the first data path 210, which comprises the logic stages 208, due to the shorter latency to the clocked memory element 204 from the latency generated by the optimization mode. This may allow more CCD processing. Then, during the CTS process, the latency to the clocked memory element 204 may be constrained to be shorter, which may produce better slack on the second data path 212. A CCD process may then be utilized to balance the slack in both the first data path 210 and the second data path 212. Additionally, an endpoint margin on the second data path 212 may be added to control the optimism of any path in the design.

Figure 3:
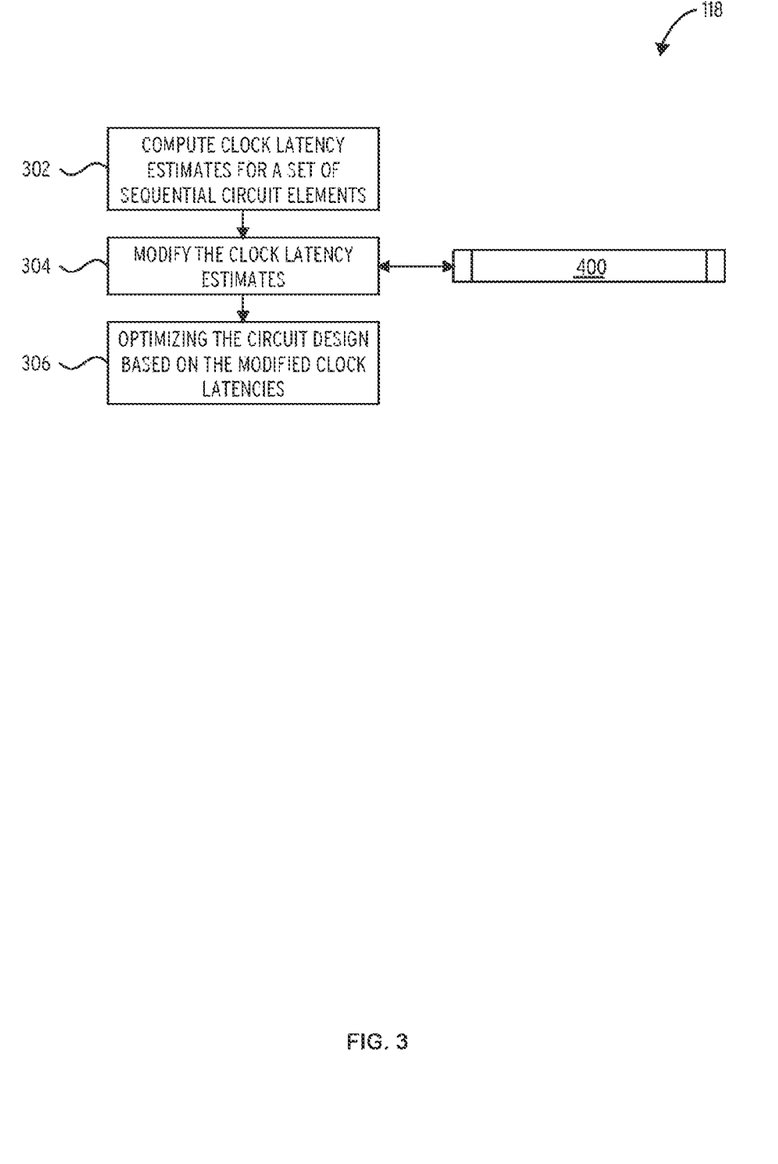
FIG. 3 illustrates an embodiment of a circuit optimization method 118.

Referring to FIG. 3, a circuit optimization method 118 computes clock latency estimates for a set of sequential circuit elements (block 302). The clock latency estimates are modified (block 304). The clock latency estimates may be modified based on relative optimizability of (1) a set of input data paths that are electrically coupled to one or more inputs of the sequential circuit element, and (2) a set of output data paths that are electrically coupled to one or more outputs of the sequential circuit element. The circuit design is optimized based on the modified clock latencies (block 306).

The optimizability of a data path may increase with the logic depth of the data path. The optimizability of un-optimizable logic may be zero. The optimizability of non-standard logic elements may be low.

In some embodiments, prior to optimizing the circuit design based on the modified clock latencies, the circuit optimization method 118 sets timing-endpoint margins for data paths by an amount corresponding to the modifications to the clock latency estimates.

In some embodiments, the circuit optimization method 118 further creates a set of clock tree constraints based on the modified clock latency estimates, removes the timing-endpoint margins for the data paths; and performs clock tree synthesis for the circuit design based on the set of clock tree constraints.

Figure 4:
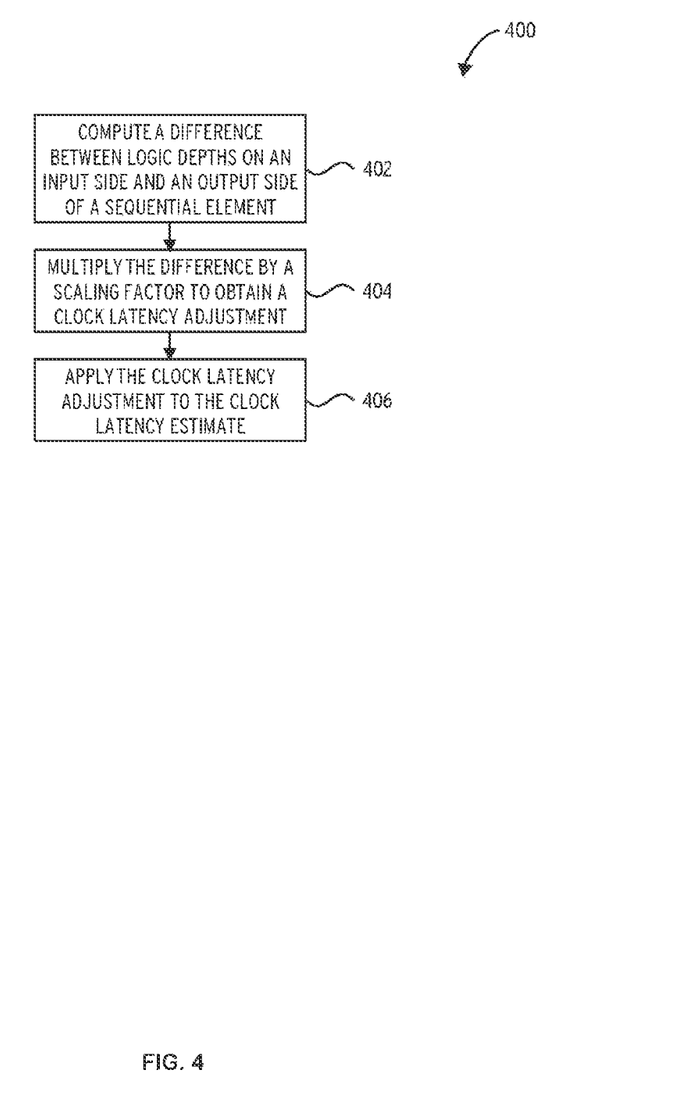
FIG. 4 illustrates an embodiment of a modification subroutine 400.

Referring to FIG. 4, a modification subroutine 400 computes a difference between logic depths on an input side and an output side of a sequential element (block 402). The difference is multiplied by a scaling factor to obtain a clock latency adjustment (block 404). The clock latency adjustment is applied to the clock latency estimate (block 406).

Figure 5:
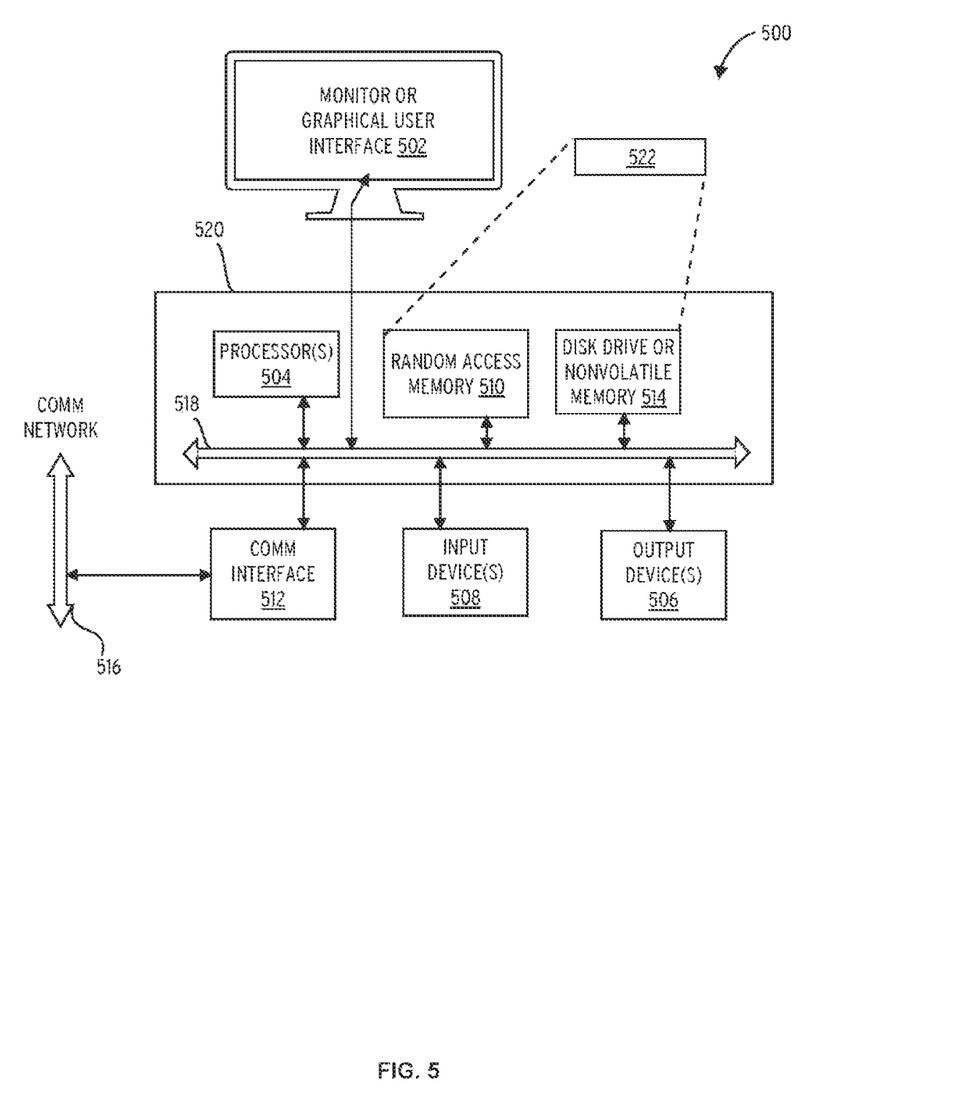
FIG. 5 is an example block diagram of a computer system 500 that may incorporate embodiments of the present invention.

FIG. 5 is an example block diagram of a computer system 500 that may incorporate embodiments of the present invention. FIG. 5 is merely illustrative of a machine system to carry out aspects of the technical processes described herein, and does not limit the scope of the claims. One of ordinary skill in the art would recognize other variations, modifications, and alternatives. In one embodiment, the computer system 500 typically includes a monitor or graphical user interface 502, a computer 520, a communication network interface 512, input device(s) 508, output device(s) 506, and the like.

As depicted in FIG. 5, the computer 520 may include one or more processor(s) 504 that communicate with a number of peripheral devices via a bus subsystem 518. These peripheral devices may include input device(s) 508, output device(s) 506, communication network interface 512, and a storage subsystem, such as a random access memory 510 and a disk drive or non-volatile memory 514.

The random access memory 510 and/or the disk drive or non-volatile memory 514 may store computer-executable instructions and thus forming logic 522 that when applied to and executed by the processor(s) 504 implement embodiments of the processes disclosed herein.

The input device(s) 508 include devices and mechanisms for inputting information to the computer 520. These may include a keyboard, a keypad, a touch screen incorporated into the monitor or graphical user interface 502, audio input devices such as voice recognition systems, microphones, and other types of input devices. In various embodiments, the input device(s) 508 are typically embodied as a computer mouse, a trackball, a track pad, a joystick, wireless remote, drawing tablet, voice command system, eye tracking system, and the like. The input device(s) 508 typically allow a user to select objects, icons, text and the like that appear on the monitor or graphical user interface 502 via a command such as a click of a button or the like.

The output device(s) 506 include all possible types of devices and mechanisms for outputting information from the computer 520. These may include a display (e.g., monitor or graphical user interface 502), non-visual displays such as audio output devices, etc.

The communication network interface 512 provides an interface to communication networks (e.g., communication network 516) and devices external to the computer 520. The communication network interface 512 may serve as an interface for receiving data from and transmitting data to other systems. Embodiments of the communication network interface 512 typically include an Ethernet card, a modem (telephone, satellite, cable, ISDN), (asynchronous) digital subscriber line (DSL) unit, FireWire interface, USB interface, and the like. For example, the communication network interface 512 may be coupled to the communication network 516 via a FireWire bus, or the like. In other embodiments, the communication network interface 512 may be physically integrated on the motherboard of the computer 520, and may be a software program, such as soft DSL, or the like.

In various embodiments, the computer system 500 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 520 in the processor(s) 504 may include one or more microprocessors from Intel®. Further, one embodiment, the computer 520 includes a UNIX-based operating system.

The random access memory 510 and the disk drive or non-volatile memory 514 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 510 and the disk drive or non-volatile memory 514 may be configured to store the basic programming and data constructs that provide the functionality of the disclosed processes and other embodiments thereof that fall within the scope of the present invention.

Software code modules and instructions that implement embodiments of the present invention may be stored in the random access memory 510 and/or the disk drive or non-volatile memory 514. These software modules may be executed by the processor(s) 504. The random access memory 510 and the disk drive or non-volatile memory 514 may also provide a repository for storing data used by the software modules.

The random access memory 510 and the disk drive or non-volatile memory 514 may include a number of memories including a main random access memory (RAM) for storage of instructions and data during program execution and a read only memory (ROM) in which fixed non-transitory instructions are stored. The random access memory 510 and the disk drive or non-volatile memory 514 may include a file storage subsystem providing persistent (non-volatile) storage for program and data files. The random access memory 510 and the disk drive or non-volatile memory 514 may include removable storage systems, such as removable flash memory.

The bus subsystem 518 provides a mechanism for letting the various components and subsystems of computer 520 communicate with each other as intended. Although the communication network interface 512 is depicted schematically as a single bus, alternative embodiments of the bus subsystem 518 may utilize multiple busses.

It will be readily apparent to one of ordinary skill in the art that many other hardware and software configurations are suitable for use with embodiments of the present invention. For example, the computer system 500 may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. They are not intended to be exhaustive or to limit the present invention to the forms disclosed. In addition, similar principles as described corresponding to latches and/or flops can be applied to other sequential logic circuit elements. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for optimizing a circuit design, the method comprising:
   computing clock-latency-estimates for a set of sequential-circuit-elements;
   modifying the clock-latency-estimate for each sequential-circuit-element based on relative optimizability of (1) a set of input data paths that are electrically coupled to one or more inputs of the sequential-circuit-element, and (2) a set of output data paths that are electrically coupled to one or more outputs of the sequential-circuit-element; and
   optimizing the circuit design based on the modified clock-latency- estimates.

2. The non-transitory computer-readable storage medium of claim 1, wherein optimizability of a data path increases with the logic depth of the data path.

3. The non-transitory computer-readable storage medium of claim 1, wherein optimizability of un-optimizable logic is zero.

4. The non-transitory computer-readable storage medium of claim 1, wherein optimizability of non-standard logic elements is low.

5. The non-transitory computer-readable storage medium of claim 1, wherein modifying at least one clock-latency-estimate comprises:
   (1) computing a difference between logic depths on an input side and an output side of a sequential element,
   (2) multiplying the difference by a scaling factor to obtain a clock-latency-adjustment, and
   (3) applying the clock-latency-adjustment to the clock-latency-estimate.

6. The non-transitory computer-readable storage medium of claim 1, wherein prior to optimizing the circuit design based on the modified clock-latency-estimates, the method comprises setting timing-endpoint margins for data paths by an amount corresponding to the modifications to the clock-latency-estimates.

7. The non-transitory computer-readable storage medium of claim 6, wherein the method further comprises:
   creating a set of clock tree constraints based on the modified clock- latency-estimates;
   removing the timing-endpoint margins for the data paths; and
   performing clock tree synthesis for the circuit design based on the set of clock tree constraints.

8. An apparatus, comprising:
   a processor; and
   a non-transitory computer-readable storage medium storing instructions that, when executed by the processor, cause the apparatus to perform a method for optimizing a circuit design, the method comprising:
      computing clock-latency-estimates for a set of sequential-circuit-elements;
      modifying the clock-latency-estimate for each sequential-circuit-element based on relative optimizability of (1) a set of input data paths that are electrically coupled to one or more inputs of the sequential-circuit-element, and (2) a set of output data paths that are electrically coupled to one or more outputs of the sequential-circuit-element; and
   optimizing the circuit design based on the modified clock-latency-estimates.

9. The apparatus of claim 8, wherein optimizability of a data path increases with the logic depth of the data path.

10. The apparatus of claim 8, wherein optimizability of un-optimizable logic is zero.

11. The apparatus of claim 8, wherein optimizability of non-standard logic elements is low.

12. The apparatus of claim 8, wherein modifying at least one clock-latency-estimate comprises:
   (1) computing a difference between logic depths on an input side and an output side of a sequential element,
   (2) multiplying the difference by a scaling factor to obtain a clock-latency-adjustment, and
   (3) applying the clock-latency-adjustment to the clock-latency-estimate.

13. The apparatus of claim 8, wherein prior to optimizing the circuit design based on the modified clock-latencyestimates, the method comprises setting timing-endpoint margins for data paths by an amount corresponding to the modifications to the clock-latency-estimates.

14. The apparatus of claim 13, wherein the method further comprises:
   creating a set of clock tree constraints based on the modified clock-latency-estimates;
   removing the timing-endpoint margins for the data paths; and
   performing clock tree synthesis for the circuit design based on the set of clock tree constraints.

15. A method for optimizing a circuit design, comprising:
   computing clock-latency-estimates for a set of sequential-circuit-elements;
   modifying the clock-latency-estimate for each sequential-circuit-element based on relative optimizability of (1) a set of input data paths that are electrically coupled to one or more inputs of the sequential-circuit- element, and (2) a set of output data paths that are electrically coupled to one or more outputs of the sequential-circuit-element; and
   optimizing the circuit design based on the modified clock-latency-estimates.

16. The method of claim 15, wherein optimizability of a data path increases with the logic depth of the data path.

17. The method of claim 15, wherein optimizability of un-optimizable logic is zero.

18. The method of claim 15, wherein optimizability of non-standard logic elements is low.

19. The method of claim 15, wherein modifying at least one clock-latency-estimate comprises:
   (1) computing a difference between logic depths on an input side and an output side of a sequential element,
   (2) multiplying the difference by a scaling factor to obtain a clock-latency-adjustment, and
   (3) applying the clock-latency-adjustment to the clock-latency-estimate.

20. The method of claim 15, wherein prior to optimizing the circuit design based on the modified clock-latency-estimates, the method comprises setting timing-endpoint margins for data paths by an amount corresponding to the modifications to the clock-latency-estimates.

21. The method of claim 20, wherein the method further comprises:
   creating a set of clock tree constraints based on the modified clock-latency-estimates;
   removing the timing-endpoint margins for the data paths; and performing clock tree synthesis for the circuit design based on the set of clock tree constraints.

* * * * *